United States Patent Office 3,116,215
Patented Dec. 31, 1963

3,116,215
OMEGA CONVERSION OF FATTY ACID
DERIVATIVES
Milton A. Mitz, Chicago, Ill., assignor, by mesne assignments, to Armour Pharmaceutical Company, a corporation of Delaware
No Drawing. Filed May 5, 1960, Ser. No. 26,961
2 Claims. (Cl. 195—30)

This invention relates to an enzyme extract prepared from animal visceral organ tissue which contains a diphosphopyridine nucleotide-dependent alcohol dehydrogenase/aldehyde reductase enzyme system catalyzing the conversion of omega-hydroxy fatty acid derivatives to the corresponding omega-oxo compounds, and conversely, catalyzing omega-oxo compounds to the corresponding omega-hydroxy compounds. This invention also relates to a process for preparing the extract, and to a process for accomplishing the conversions.

Crude cell homogenates of the visceral organs of animals exhibit certain known fatty acid oxidation activity. The usual mode of fatty acid oxidation is beta oxidation, the catalyzing enzyme being largely centered in the mitochondria of animal cells. Recently Robbins has in U.S. application Nos. 26,955 filed May 5, 1963, and 26,962, filed May 6, 1962, described a crude extract of animal cells having omega oxidase activity.

I have discovered that by subjecting the crude omega oxidation enzyme system of Robbins to a certain process its activity can not only be greatly enhanced, but be altered so that it is strikingly different from that of the crude system.

Thusly, one object of my invention is to provide a highly potent fatty acid alcohol dehydrogenase/aldehyde reductase enzyme extract derived from animal visceral organ tissues which catalyzes the equilibrium reaction converting omega-hydroxy straight chain normal fatty acid derivatives having at least eight carbon atoms to the corresponding omega-oxo fatty acid compounds, and conversely to the omega-hydroxy compounds. Another object is to provide a method for preparing omega-oxo fatty acid derivatives having at least 8 carbon atoms from the corresponding omega-hydroxy acid derivatives. Still another object is to provide a method for preparing omega-hydroxy acid derivatives having at least eight carbon atoms from the corresponding omega-oxo compounds. Yet another object is to provide a method for preparing a highly potent fatty acid alcohol dehydrogenase/aldehyde reductase extract which is specific for certain fatty acid derivatives having at least eight carbon atoms. Other objects and advantages will appear as the specification proceeds.

My invention broadly stated involves a highly potent enzyme preparation which catalyzes the following reaction:

$$HOCH_2(CH_2)_xCOOR + DPN^+$$
$$\rightleftharpoons OCH(CH_2)_xCOOR + DPNH + H^+$$

wherein X is an integer of at least 6 and R is an alkyl group, a metallic cation or hydrogen.

The process of this invention provides a method for preparing various omega-hydroxy and omega-oxo fatty acid derivatives which are useful intermediates in the synthesis of large ring lactones valuable as perfume and flavoring ingredients, and in the production of polymers for plastics manufacture.

In one aspect of this invention, there is provided a method for extraction of an enzyme system which catalyzes the above mentioned conversion. Activity of this enzyme system is centered in the soluble fractions of visceral organ cells. Suitable starting material from which the enzyme systems is extracted may be tissue from any of the more rapidly metabolizing animal visceral organs such as liver, kidney, and heart. Porcine, equine and sheep livers are preferred starting materials because of the relatively high enzyme activity extractable from them.

Briefly the extraction process includes the steps of homogenizing suitable organ tissue, solvent precipitating the cold homogenate as with alcohol or acetone, dialyzing the supernatant against water or a suitable buffer, treating the dialyzed supernatant with a clay adsorbent such as bentonite, and preferably further purification of the supernatant by contact with equilibrated diethylaminoethyl (DEAE) cellulose.

In the preferred practice of this aspect of my invention porcine liver tissue is homogenized and diluted with distilled water, sucrose solution, dilute salt solution, or similar diluents. Throughout all steps of the extraction cold temperatures are preferably maintained, 5° C. being the preferable maximum temperature in most steps. The tissue homogenate is then precipitated by a solvent, such as ethanol, the quantity of ethanol being equal to about 37% of the final volume of the tissue mixture. Acetone may be used in place of the ethanol. About 1 part by volume of ethanol or acetone is added to about 2 parts by volume of tissue homogenate, allowance being made for water added to the solvent. A range of about 20 to 40% solvent by volume is satisfactory. Preferably the ethanol or acetone is added in the form of a water solution. Throughout the solvent precipitation procedure the tissue homogenate should be maintained at temperatures near the freezing point of the mixture but without allowing freezing to occur. pH values of about 6.0 to 8.0 should be maintained during this step.

Following solvent precipitation the mixture is separated as by gravity settling or by centrifugation or other like methods of mechanical separation. The resulting separated supernatant may then be dialyzed, oxygen preferably being excluded during dialysis. Although the supernatant may be dialyzed against water, I prefer to use dilute cysteine solution as a precaution against oxidation during dialysis. Specifically I prefer to dialyze the supernatant to equilibrium against a convenient buffer, at about pH 6 to 7.8, containing up to about 0.01 M cysteine. Cysteine concentration may be varied within wide limits. If DEAE-cellulose sorption is later used the dialysis step serves as a pretreatment of the supernatant thereby preparing it for DEAE-cellulose purification. If DEAE-cellulose purification is used about 0.01 to 0.035 M potassium phosphate buffer may be substituted for water. After dialysis the supernatant may be advantageously clarified as by centrifugation. If oxidation occurs during this dialysis step enzymatic activity will be somewhat reduced. After clarification the dialyzed supernatant may then be treated with a clay such as bentonite or a comparable adsorbent. Although a range of about 2.5 to 10 mg. of clay adsorbent per ml. of supernatant is preferred, some variation outside this range may be resorted to without markedly affecting yields. After this treatment the supernatant may be advantageously separated from the adsorbent by centrifugation. Following removal of the adsorbent the purified supernatant may be further purified with DEAE-cellulose if desired, about 2.5 to 10 mg. of DEAE-cellulose per ml. of solution being the preferred ratio. Before this last purification step the DEAE-cellulose is preferably equilibrated with about 0.01 M to 0.035 M phosphate buffer, at about pH 6.0 to 7.8. Careful technique should be used during this equilibration conditioning because too low a concentration of buffer will cause the enzyme to be adsorbed, later necessitating its desorption by selective elution. At a buffer concentration of 0.01 M essentially all enzyme is adsorbed, while at a concentration of around 0.035 M little or no fractionation occurs.

Although inclusion of the DEAE-cellulose purification step is not necessary, its use almost doubles the potency of the resulting concentrate. Although the crude tissue homogenate in itself has some of the desired enzymatic activity, about a 60 to 200 fold increase in enzymatic activity is achieved by carrying out the complete extraction as outlined hereinbefore. The complete extraction process removes other enzymes in the crude homogenate which are in competition with the enzymes catalyzing the conversion process of this invention. If competing beta-oxidizing system are not at least partially removed the omega conversion reactions cannot be closely controlled and the desired omega-end-products will be further contaminated. In addition, the character of the crude enzyme system changes upon ethanol or solvent precipitation so drastically that the refined system might be described as a new system, as will later appear.

A second aspect of this invention involves conversion of suitable substrates by the extracted enzyme system. The extracted system may be described as an omega-hydroxy fatty acid dehydrogenase or an omega-aldehyde reductase. This enzyme system is DPN-dependent. That is, an appropriate form of diphosphopyridine nucleotide must be available in the reaction mixture for the desired conversion to occur. In order for the reaction to proceed from left to right, from the alcohol to the corresponding aldehyde or oxo compound, oxidized diphosphopyridine nucleotide is necessary. For the reaction to proceed in the opposite direction, from the omega-oxo fatty acid derivative to the corresponding alcohol, reduced diphosphopyridine nucleotide (DPNH) must be available. Direction of the conversion is controlled by pH, an acid reaction system favoring conversion from the aldehyde to the corresponding alcohol and a basic condition favoring formation of the aldehyde. Any pH value within the range of about 6.5 to 10.5 is acceptable. The optimum activity pH of the system is 9.5 to 10. The equilibrium constant at ph 9 for the above illustrated reaction is $2.36 \times 10^{-11}$. The Michaelis Constant, Km value, is $6.6 \times 10^{-4}$ for DPN, with 10-hydroxy decanoic acid at $3.3 \times 10^{-4}$ M. Km for 10-hydroxydecanoic acid is $1.25 \times 10^{-4}$, with DPN at $1 \times 10^{-4}$ M. Although the crude system strongly favors the reaction from left to right, the potentiated system favors the right to left reaction as above illustrated.

Practically speaking, any level of diphosphopyridine nucleotide is operable although a slight excess of the appropriate form of DPN is desirable. The form of diphosphopyridine nucleotide, in addition to the pH, influences the direction of reaction; DPNH favors aldehyde conversion, and DPN directs the reaction toward alcohol formation. Approximately one mole of DPN is reduced to DPNH for each mole of hydroxy acid formed.

In this second aspect of my invention, the conversion process, suitable substrates are unbranched, omega-hydroxy or oxo fatty acid derivatives having at least 8 carbon atoms. The purified enzyme system is highly active on derivatives having 8 to 13 carbon atoms. Acids, salts and esters of these alcohols and aldehydes form the class of compounds converted by my purified enzyme system.

Preferably a temperature of about 37° C. is maintained during this conversion, but any temperature from about 0° C. to a maximum of about 50° C. is operable. Temperatures approaching 0° C. greatly impede rate of conversion and temperatures much above 50° C. may cause permanent inactivation of the enzyme system.

A substrate concentration of about 0.03 µM per ml. to 1.0 µM per ml. is preferred. End product yields will be reduced when certain hydroxy acids are supplied as substrates if concentrations greatly in excess of 1.0 mµM per ml. are added to the reaction system.

A pH range of about 8.5 to 10 favors conversion of alcohols to the aldehydes. A range of pH 6.5 to 8.48 favors the reverse reaction, aldehyde to alcohol. Several compounds inhibit this reaction and therefore should be excluded from the reaction system. However, the degree of inhibition appears to depend on the concentration of enzyme substrate and coenzyme, DPN. Although the crude omega oxidase system is stimulated by hydrazine, the purified and modified system is inhibited by hydrazine. Compounds in addition to hydrazine which cause inhibition are the following: semicarbazide, iodoacetic acid, iodoacetamide and parachloro-mercuribenzoate. Although the crude tissue extract is effective in converting the following compounds the potentiated enzyme has no such activity: ethanol, butanol, amino ethanol, 2,2-dimethylaminoethanol and 1,6-dihydroxyhexanol.

This invention will be more fully illustrated by the following examples:

EXAMPLE I

All procedures were carried out at about 1 to 5° C. unless otherwise indicated. 100 gm. of porcine liver which had been frozen for 2 weeks was homogenized with 100 ml. of 0.5 M potassium chloride in a Waring Blendor for 5 minutes. The homogenate was diluted with 100 ml. of 0.5 M potassium chloride and 10 ml. of 1 M phosphate buffer, pH 7.4. The mixture was stirred for 30 minutes and then placed in a bath at $-5°$ C. To this mixture was added 200 ml. of a solution of 0.25 M potassium chloride and 50% ethanol, the solution being at a temperature of $-20°$ C. The ethanol precipitate after centrifugation at $-5°$ C. was discarded and the supernatant dialyzed for 16 hours against 0.025 molar potassium phosphate buffer, pH 7.4 containing 0.001 M cysteine, after clarifying the solution by centrifugation. 5 mg. of bentonite per ml. of solution were added, the mixture stirred and again centrifuged. Finally each ml. of solution was treated for 15 minutes with 10 mg. of DEAE-cellulose equilibrated with 0.025 M potassium phosphate buffer at pH 7.4. The supernatant solution was stored for a week at refrigerator temperatures without loss in activity.

EXAMPLE II

Dehydrogenase activity was assayed by following the rate of DNP reduction in a Beckman Spectrophotometer, Model DU, 340 mµ at 37° C. The reaction mixture contained 100 µM Glycine Buffer, pH 9.5, 3 µM DPN, 1 µM, potassium salt of 10-hydroxydecanoic acid and the enzyme preparation to be tested, in a final volume of 3 ml. Ten minutes were allowed for the mixture to equilibrate. The subtrate, added last, was omitted from the control cell. The rate of DNP reduction was found to be directly proportional to the enzyme concentration for at least 3 minutes up to an optical density change of 0.40 per minute. The unit of enzyme activity was defined as a change in optical density of 0.001 per minute; the specific activity was defined as the number of units per mg. of protein. Table I below summarizes the specific activity of a typical enzyme preparation at each stage of the extraction as described in Example I.

*Table 1*

| Process Step | Solution | Specific Activity, Units/mg. Protein | Activity Yield, percent |
|---|---|---|---|
| 1 | salt extract | 1.1 | 100 |
| 2 | ethanol supernatant | 31.8 | 96 |
| 3 | bentonite supernatant | 143 | 55 |
| 4 | DEAE-cellulose supernatant | 223 | 54 |

Table II below compares the specific activity of the preparations at each stage of the extraction as set out in Example I and compares that activity with ethanol dehydrogenase activity.

*Table II*

|  | Specific Activity 10-hydroxy Decanoic Acid | Ethanol Dehydrogenase Activity |
|---|---|---|
| Salt extract | 1.1 | 1.5 |
| Ethanol precipitate | 5.7 | 1.39 |
| Ethanol supernatant | 26.1 | 0.09 |
| Bentonite supernatant | 143 | 0.01 |
| DEAE-cellulose supernatant | 223 | 0 |

EXAMPLE III

The distribution of omega-hydroxy fatty acid dehydrogenase was studied. Various species and organs were evaluated for specific activity. The organs were homogenized and extracted for 3 hours at room temperatures with 2 volumes of water. The solution was centrifuged and the relative activity determined as in Example I, using hog liver as a base.

| Source: | Relative specific activity |
|---|---|
| Hog liver | 100 |
| Horse liver | 200 |
| Hog kidney | 60 |
| Hog heart | 25 |
| Sheep liver | 80 |
| Rat liver | 50 |

EXAMPLE IV

Using the conditions as described in the assay, Example II, except a concentration of 0.2 μM of the potassium salts of the hydroxy acids were used in each case, a comparison of activities on different hydroxy acids with a single preparation showed the following results:

| Omega hydroxy acids: | Change in optical density/minutes |
|---|---|
| Nonic | 0.076 |
| Decanoic | 0.148 |
| Undecanoic | 0.132 |

Having described my invention in considerable detail for the purpose of illustration, it will be apparent to those skilled in the art that many details of it can be varied widely without departing from the spirit of this invention.

I claim:

1. The process of enzymatically converting unbranched omega-oxo fatty acid, fatty acid salt and fatty acid esters thereof having at least 8 carbon atoms to the corresponding omega-hydroxy derivative comprising the steps of contacting said omega-oxo compound with an enzyme system concentrated in the soluble fractions of visceral organ tissue cells in the presence of reduced diphosphopyridine nucleotide, maintaining the temperature of the system between about 0° and 50° C. and adjusting the pH of said system to a range between about 6.5 to 8.48; said enzyme system being extracted from a cell homogenate by adding solution of a solvent to the homogenate to attain a final volumetric concentration of about 20 to 40% solvent while said homogenate is held at a pH of about 6 to 8, separating the solvent treated homogenate, and collecting the resultant supernatant.

2. The process of enzymatically converting unbranched omega-hydroxy fatty acid, fatty acid salt and fatty acid ester having at least 8 carbon atoms to the corresponding omega-oxo derivative comprising the steps of contacting said omego-hydroxy compound with an enzyme system extracted from the soluble fractions of animal visceral organ tissue cells, supplying oxidized diphosphopyridine nucleotide to said system, maintaining the temperature between about 0° C. to about 50° C. and adjusting the pH of said system to a range between about 8.5 to 10.5; said enzyme system being extracted from a cell homogenate by adding solution of a solvent to the homogenate to attain a final volumetric concentration of from 20 to 40% solvent while said homogenate is held at a pH of about 6 to 8, separating the solvent treated homogenate, and collecting the resulting supernatant.

References Cited in the file of this patent

UNITED STATES PATENTS

| 424,457 | Russell | Mar. 25, 1890 |
| 454,575 | Webber | Jan. 23, 1893 |
| 1,833,716 | Kluyver | Nov. 24, 1931 |
| 2,573,358 | Renner | Oct. 30, 1951 |
| 2,676,906 | Rose et al. | Apr. 27, 1954 |
| 2,686,148 | Thompson | Aug. 10, 1954 |